United States Patent
Shiojima et al.

(10) Patent No.: US 9,843,848 B2
(45) Date of Patent: Dec. 12, 2017

(54) SPEAKER UNIT

(71) Applicant: YAMAHA CORPORATION, Hamamatsu-shi, Shizuoka-ken (JP)

(72) Inventors: Hiroyuki Shiojima, Hamamatsu (JP); Kazuya Atsumi, Hamamatsu (JP); Katsutoki Hanayama, Hamamatsu (JP); Satoshi Hayakawa, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/008,954

(22) Filed: Jan. 28, 2016

(65) Prior Publication Data

US 2016/0227306 A1  Aug. 4, 2016

(30) Foreign Application Priority Data

Jan. 30, 2015 (JP) .................................. 2015-017992

(51) Int. Cl.
*H04R 1/02* (2006.01)
*F16B 13/04* (2006.01)

(52) U.S. Cl.
CPC ............. *H04R 1/025* (2013.01); *H04R 1/026* (2013.01); *F16B 13/04* (2013.01); *H04R 2201/021* (2013.01)

(58) Field of Classification Search
CPC .. H04R 1/025; H04R 1/026; H04R 2201/021; F16B 13/04
See application file for complete search history.

(56) References Cited

U.S. PATENT DOCUMENTS 4,546,850 A    10/1985   Litner
5,931,432 A *   8/1999   Herold .................... F21V 21/04
                                        248/343

(Continued)

FOREIGN PATENT DOCUMENTS

EP          2675184 A1    12/2013
JP      2014017810 A     1/2014

OTHER PUBLICATIONS

Extended European Search Report issued in European Appln. No. 16153058.9 dated Jun. 8, 2016.

(Continued)

*Primary Examiner* — Andrew L Sniezek
(74) *Attorney, Agent, or Firm* — Rossi, Kimms & McDowell LLP

(57) ABSTRACT

Disclosed is a speaker unit which includes a provisionally fastening mechanism provided on a side surface of a cabinet section for provisionally fastening the speaker unit to a mounting part with at least a portion of the cabinet section inserted in an opening section of the mounting part from a face side of the mounting part. The provisionally fastening mechanism includes an engagement section for provisionally fastening the speaker unit to the mounting part, and a retention section for retaining the engagement section. The engagement section is movable between an engagement position in which the engagement section engages with the mounting part and a cancellation position in which the engagement section cancels the engagement with the mounting part by being moved away from the mounting part, and the retention section retains the engagement section in the cancellation position.

7 Claims, 8 Drawing Sheets

(56) References Cited

U.S. PATENT DOCUMENTS

| | | | | |
|---|---|---|---|---|
| 6,896,394 B2* | 5/2005 | Houle | ............... | F21V 21/04 |
| | | | | 362/147 |
| 2011/0180678 A1 | 7/2011 | Liu | | |
| 2013/0327586 A1 | 12/2013 | Tanaka et al. | | |
| 2014/0305734 A1* | 10/2014 | Ivey | ............... | H04R 1/025 |
| | | | | 181/150 |
| 2016/0227307 A1* | 8/2016 | Shiojima | ............ | H04R 1/026 |

OTHER PUBLICATIONS

Extended European Search Report issued in European Appln. No. 16153059.7 dated Jun. 8, 2016.

Office Action issued in U.S. Appl. No. 15/009,035 dated Feb. 8, 2017.

Notice of Allowance dated May 26, 2017 in U.S. Appl. No. 15/009,035.

* cited by examiner

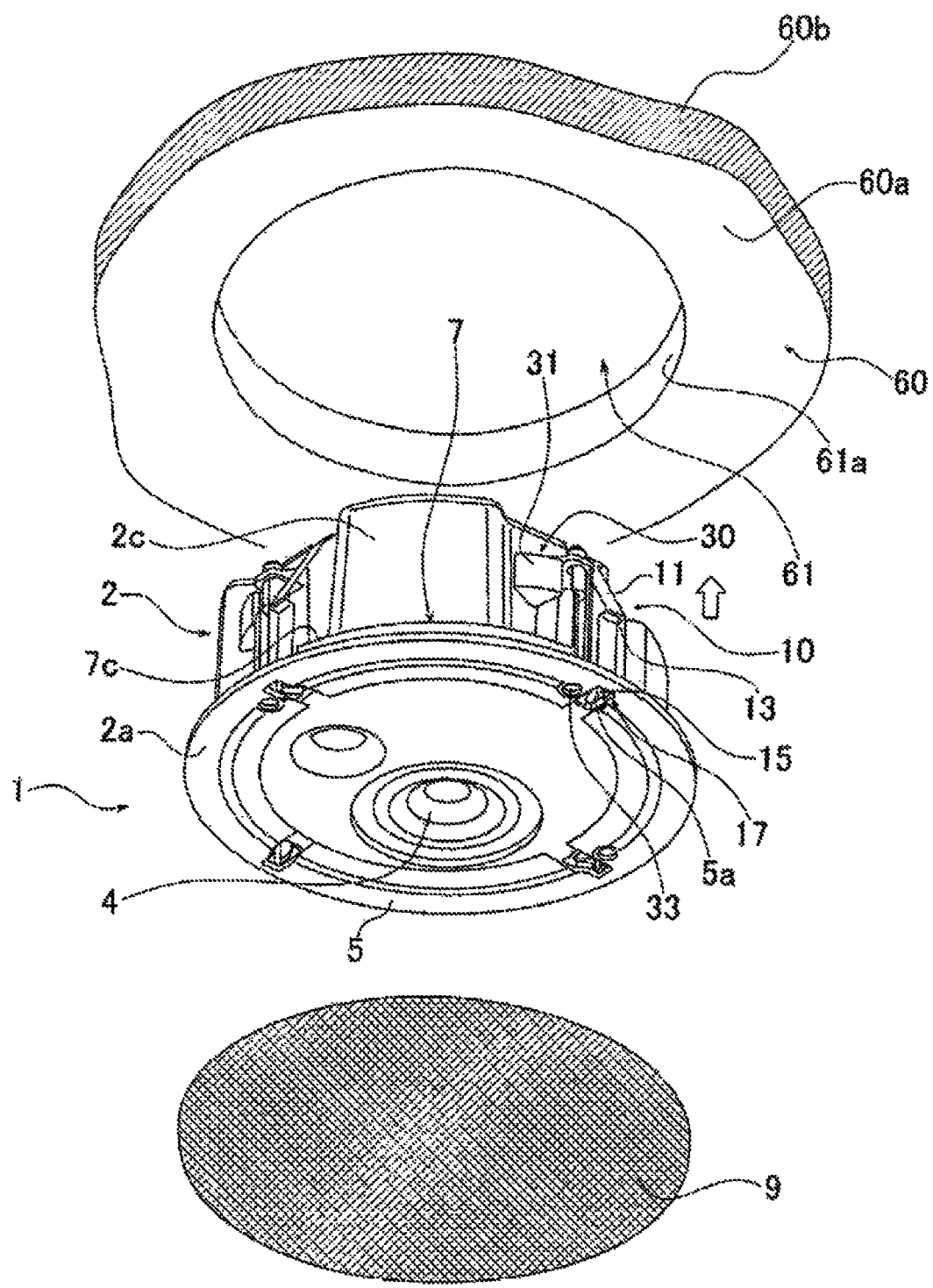
F I G. 1

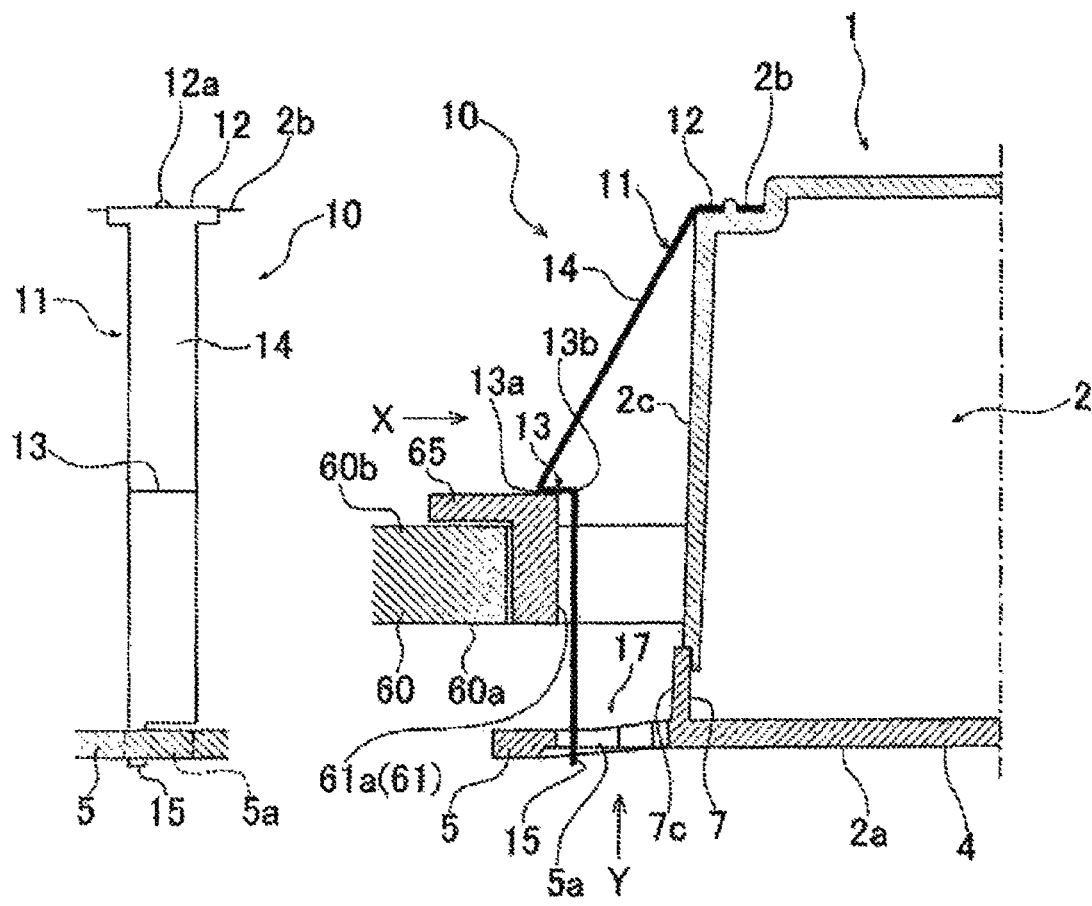
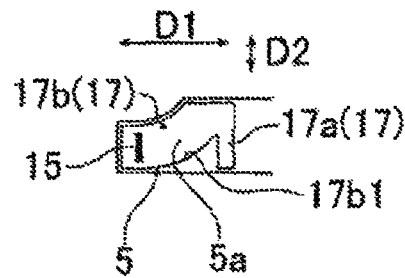
FIG. 3B  FIG. 3A
FIG. 3C

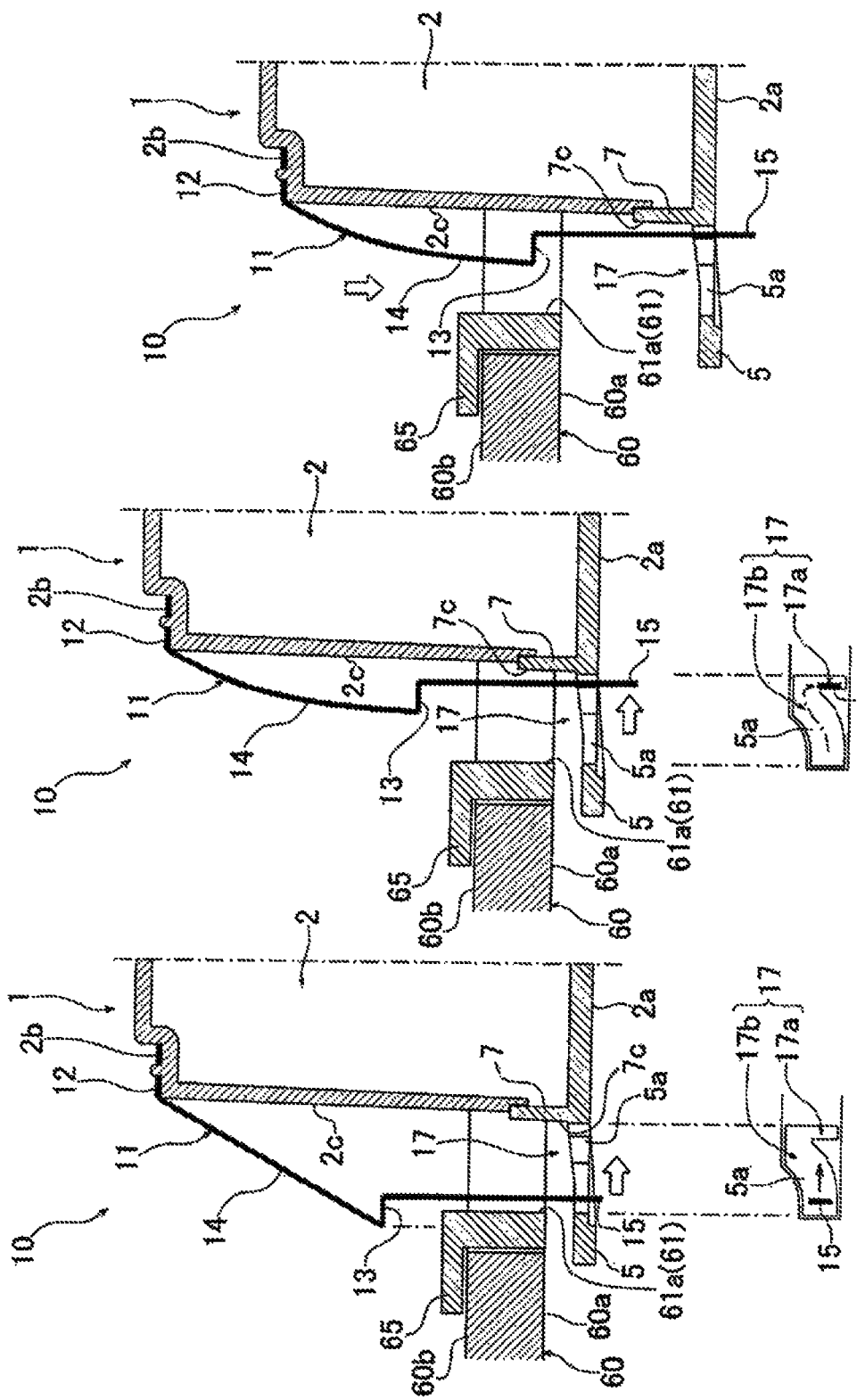

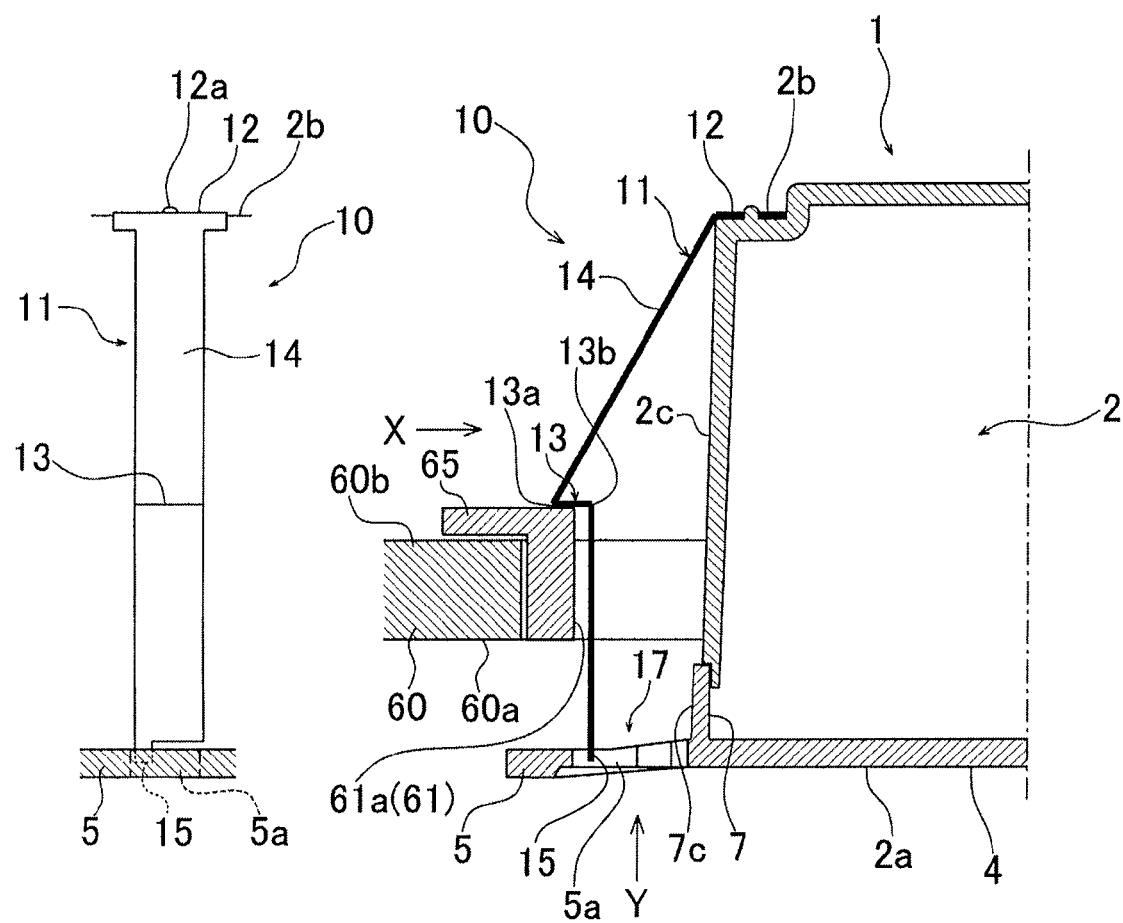
F I G. 8 B    F I G. 8 A

SPEAKER UNIT

BACKGROUND

The present invention relation to embedded type speaker units mountable by being embedded in an opening section formed in a mounting part, such as a ceiling or side wall.

There have heretofore been known embedded type speaker units (such as ceiling speakers) that are installed or mounted by being embedded in an opening section formed in a ceiling or the like of a room, as disclosed for example in Japanese Patent Application Laid-open Publication No. 2014-017810 (hereinafter referred to as "the relevant patent literature"). Generally, such speaker units include a cabinet section of a substantially cylindrical shape, and a speaker face provided in the bottom surface of the cabinet section. To mount the speaker unit to a ceiling, for example, the cabinet section is inserted into a mounting hole (opening section) of the ceiling with the speaker face exposed on the face (i.e., lower surface) of the ceiling, and then the inserted cabinet section is fixed or fastened to the ceiling by fastening via bolts or the like. A mounting structure for such a speaker unit includes a provisionally fastening mechanism for preventing the heavy speaker unit from falling down accidentally or by mistake before the fastening via the bolts or the like or after cancellation of the fastening, as disclosed in the relevant patent literature.

In the speaker unit disclosed in the relevant patent literature, a plurality of the provisionally fastening mechanisms are provided for provisionally fastening the speaker unit in such a manner as to reliably prevent the speaker unit from accidentally falling down from the opening section (mounting hole). When the speaker unit is to be dismounted for maintenance or replacement, there arises a need to cancel the fastening, with respect to the mounting hole, of all of the provisionally fastening mechanisms. Because a human operator cannot simultaneously cancel the fastening of three or more provisionally fastening mechanisms, it has generally been conventional for the human operator to cancel with one hand the fastening of a particular one of the provisionally fastening mechanisms while retaining with the other hand one or some of already-canceled provisionally fastening mechanisms in a canceled state.

However, in a case where the speaker unit is heavy in weight and/or located at a high position, and if one hand of the human operator is occupied or busy with something else, safety of the human operator cannot be secured and the operation for mounting and dismounting the speaker unit cannot be performed efficiently in such situations.

SUMMARY OF THE INVENTION

In view of the foregoing prior art problems, it is an object of the present invention to provide an improved speaker unit which can be efficiently mounted and dismounted to and from a mounting part and yet is simple in construction.

Note that the same reference numerals as used for various constituent elements of later-described embodiments of the present invention are indicated in parentheses here for ease of understanding.

In order to accomplish the above-mentioned object, the present invention provides a speaker unit (1) for mounting to an opening section (61) formed in a mounting part (60), which comprises: a cabinet section (2) having a side surface (2c) and a bottom surface (2a); a speaker surface (4) provided in the bottom surface (2a) of the cabinet section (2); and a provisionally fastening mechanism (10) provided on the side surface (2c) of the cabinet section (2) and configured to provisionally fasten the speaker unit (1) to the mounting part (60) with at least a portion of the cabinet section (2) inserted in the opening section (61) from a face side of the mounting part (60), the provisionally fastening mechanism (10) including an engagement section (13) configured to provisionally fasten the speaker unit (1) to the mounting part (60), and a retention section (17) configured to retain the engagement section (13), the engagement section (13) being movable between an engagement position in which the engagement section (13) engages with the mounting part (60) and a cancellation position in which the engagement section (13) cancels the engagement with the mounting part (60) by being retracted from the mounting part (60), the retention section (17) retaining the engagement section (13) in the cancellation position.

With the retention section provided in the provisionally fastening mechanism as above, the engagement section can be retained in the cancellation position. Thus, even where the provisionally fastening mechanism has a plurality of such engagement sections, there is no need for a human operator to retain with one hand the engagement section released from the engagement with the mounting part. In this way, the human operator can sequentially cancel the engagement of the engagement sections with the mounting part, with the result that dismounting of the speaker unit from the mounting part can be performed with an enhanced efficiency. Further, when all of the engagement sections have been released from the engagement position with the mounting part, the both hands of the human operator are unoccupied or free, so that the human operator can reliably grasp the speaker unit with the both hands and can thereby safely dismount the speaker unit from the mounting part.

Further, when the speaker unit is to be mounted to the mounting part too, the speaker unit can be positioned appropriately relative to the mounting part with the engagement section retained by the retention section in advance, and then the engagement section can be placed in engagement with the mounting part after the retention by the retention section is canceled. In this way, operation for provisionally fastening the speaker unit to the mounting part can be performed smoothly and safely at the time of the mounting of the speaker unit.

In an embodiment of the invention, the retention section (17) has a retention groove (17a) configured to retain the engagement section (13) in the cancellation position, and a guide groove (17b) communicating with the retention groove (17a) and configured to guide movement of the engagement section (13) between the engagement position and the cancellation position. Because the retention section has the retention groove communicating with the guide groove as above, the engagement section can be guided smoothly to the cancellation position, so that the operation for mounting and dismounting the speaker unit to and from the mounting part can be performed more efficiently.

Further, in an embodiment of the invention, the guide groove (17b) has a slant surface (17b1) for gradually bending or displacing a direction of movement, along the guide groove (17b), of the engagement section (13), and the retention groove (17a) extends from an end of the slant surface (17b1) in a direction traversing the movement direction of the engagement section (13). Thus, as the human operator moves the engagement section toward the cancellation position with a view to canceling the engagement with the mounting part, the slant surface of the guide groove causes the engagement section to move along the guide groove while being gradually laterally displaced by the slant surface. Because the retention groove extends from the end of the slant surface in the direction traversing the movement direction, along the guide groove, of the engagement section, the engagement section is directed, from the end of the guide surface, generally perpendicularly into the retention section, and then the engagement section, having so far been laterally displaced by the slant surface, resiliently returns to its normal posture and is reliably retained in the retention groove. Thus, as the engagement section is moved from the engagement position to the cancellation position, the engagement section can be readily and reliably directed along the guide groove into the retention groove that can reliably retain the engagement section. In this way, the operation for mounting and dismounting the speaker unit to and from the mounting part can be performed even more efficiently.

Further, in an embodiment of the invention, the retention section (17) is provided in association with an opening (5a) or a recess formed in a flange section (5) projecting radially outward from the outer circumferential or peripheral edge of the bottom surface (2a) of the cabinet section (2). Because the retention section is provided in association with the opening portion or recess formed in the flange section of the cabinet section, the human operator can operate the engagement section while viewing the engagement section through the opening portion or recess, with the result that the operation for mounting and dismounting the speaker unit to and from the mounting part can be performed even more efficiently.

Further, in an embodiment of the invention, the engagement section (13) is constructed so that its distal end projects to a face side beyond the speaker surface (4). Because the distal end of the engagement section projects to the face side beyond the speaker surface like this, the human operator can operate and view the engagement section with an increased ease.

Furthermore, in an embodiment of the invention, the engagement section (13) is constructed so that its distal end is disposed retracted from the speaker surface (4) in a direction toward the reverse side, without projecting to a face side beyond the speaker surface. Because the operating section does not project from the speaker surface, a degree of structural freedom of elements around the speaker surface can be significantly enhanced. Even with this non-projecting construction, the human operator can perform the operation while viewing the engagement section through the opening portion, with the result that the operation for mounting and dismounting the speaker unit to and from the mounting part can be performed even more efficiently.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which:

FIG. 1 is a perspective view schematically showing a preferred embodiment of a speaker unit of the present invention along with an example of a mounting hole of a mounted part to which the speaker unit is to be mounted;

FIGS. 3A to 3C show the speaker unit provisionally fastened to the mounting part, of which FIG. 3A is a side sectional view showing the speaker unit provisionally fastened to the mounting hole of the mounting part, FIG. 3B is a side view as viewed in a direction of arrow X of FIG. 3A, and FIG. 3C is a front view as viewed in a direction of arrow Y of FIG. 3A;

FIGS. 4A to 4D are perspective views of the provisionally fastening mechanism as viewed from a face side of a flange section, of which FIG. 4A shows a state in which the engagement section is in the engagement position in which it engages with the mounting part, FIG. 4B shows a state in which the operating section has abutted against a slant surface of a guide groove of a retention section, FIG. 4C shows a state in which the operating section has reached a retention groove of the retention section, and FIG. 4D shows a state in which the operating section has been retained by the retention groove with the engagement section placed in the cancellation position in which the engagement section has canceled the engagement with the mounting part by being moved away from the mounting part;

FIGS. 5A to 5C are schematic views explanatory of a construction and behavior of a stopper mechanism, of which FIG. 5A shows a state in which a stopper piece is in an initial position, FIG. 5B shows a state in which the stopper piece has pivoted from the initial position, and FIG. 5C shows a state in which the stopper piece is in a fixed position;

FIGS. 6A to 6C are views showing an operational sequence for dismounting the speaker unit from the mounting part, of which FIG. 6A shows a state in which the engagement section is in the engagement position, FIG. 6B shows a state in which the engagement section is in the cancellation position, and FIG. 6C shows a state in which the cabinet section has been displaced away from the mounting part; and FIGS. 7A to 7C show an operational sequence for mounting the speaker unit to the mounting part, of which FIG. 7A shows a state before a cabinet section of the speaker unit is mounted to the mounting part, FIG. 7B shows a state in which the engagement section is in the cancellation position, and FIG. 7C shows a state in which the engagement section has moved to the engagement position.

FIGS. 8A and 8B are a side sectional view and a side view, respectively, showing a modification of the operating section shown in FIGS. 3A and 3B.

DETAILED DESCRIPTION

Figure 2:
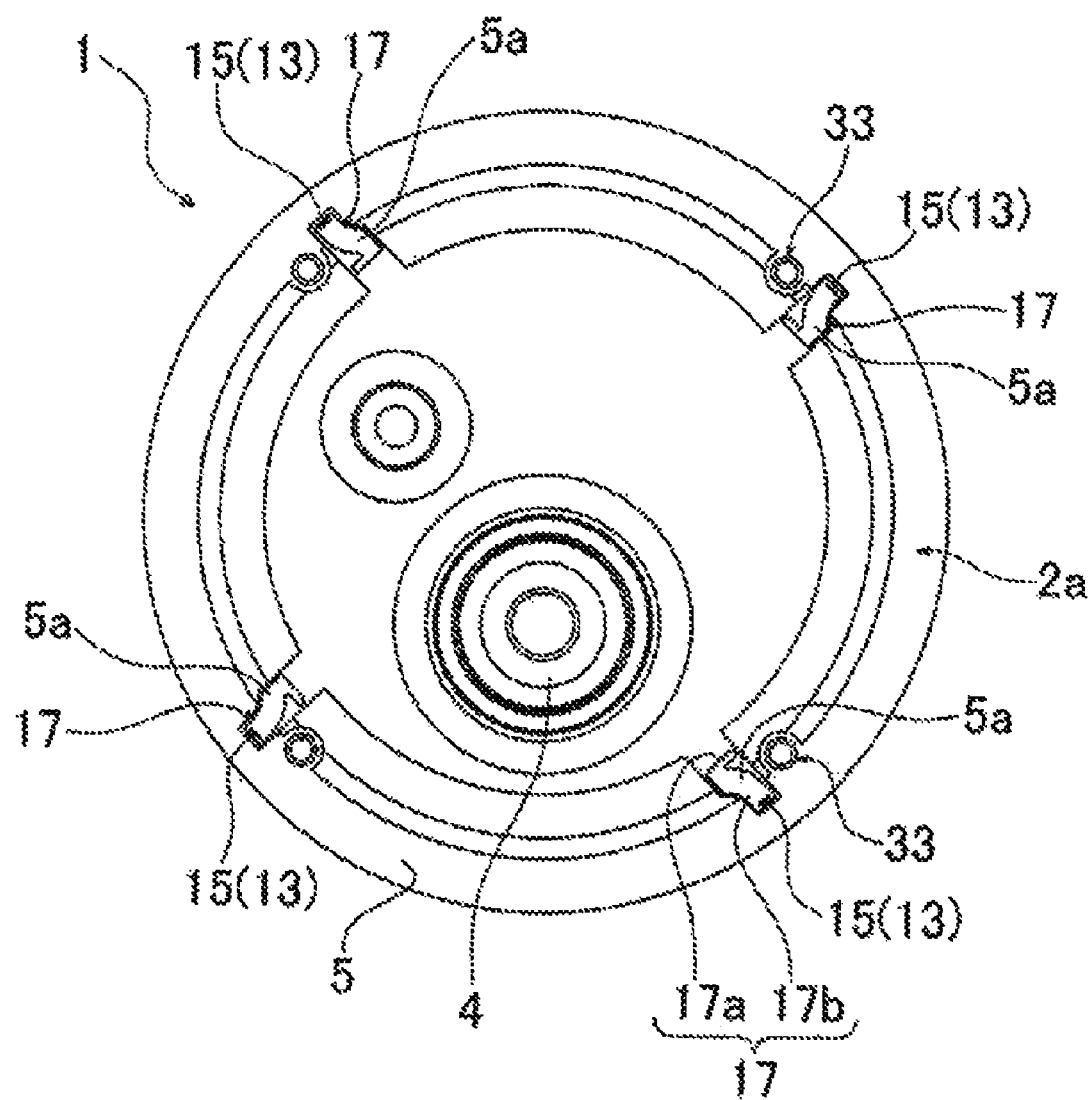
FIG. 2 is a schematic plan view of the speaker unit as viewed from a face side of a speaker surface.

The following describe preferred embodiments of the present invention with reference to the accompanying drawings. FIG. 1 is a perspective view schematically showing a preferred embodiment of a speaker unit of the present invention along with an example of a mounting hole in which the speaker unit is to be mounted. In the following description, the term "face side" refers to a side visible from outside a mounting part 60 after the speaker unit 1 is mounted on the mounting part 60 (i.e., outer side of the mounting part 60), while the term "reverse side" refers to a side invisible from outside the mounting part 60 after the speaker unit 1 is mounted on the mounting part 60 (i.e., inner side of the mounting part 60). Further, in the following description, the term "upper" or "upper side" refers to the reverse side of the speaker unit 1, while the term "lower" or "lower side" refers to the face side of the speaker unit 1.

The speaker unit 1 of the present invention is an embedded type speaker unit (ceiling speaker in the illustrated example) installable or mountable by being embedded in the mounting hole (opening section) 61 formed in the mounting part 60 such as a ceiling. The mounting hole 61 of the mounting part 60 is a circular through-hole formed through the mounting part 60 from a face side surface 60*a* to a reverse side surface 60*b* of the mounting part 60. The speaker unit 1 comprises: a cabinet section 2 having an outer peripheral side surface 2*c* and a bottom surface 2*a*; a speaker face 4 provided in the bottom surface 2*a* of the cabinet section 2; and a speaker cover 9 attached to the face side of the speaker face 4 to cover the speaker face 4.

A bottom cover 7 is provided to surround the bottom surface 2*a* of the cabinet section 2 and a part of the outer periphery of the cabinet section 2 adjoining the bottom surface 2*a*. More specifically, the bottom cover 7 is an annular member that surrounds and covers the bottom surface 2*a* of the cabinet section 2 and a part of the outer periphery of the cabinet section 2 immediately above the bottom surface 2*a*. The outer peripheral surface (outer peripheral edge) 7*c* has a diameter slightly smaller than that of the inner peripheral edge 61*a* of the mounting hole 61 but greater than an outer diameter of an upper end portion of the cabinet section 2. Namely, the bottom cover 7 is formed as an annular (ring-shaped) projection projecting radially outward from the bottom surface 2*a* and the part of the outer circumference or periphery of the cabinet section 2 adjoining the bottom surface 2*a*. Further, the bottom cover 7 is formed and disposed in such a manner that, with the speaker unit 1 installed or mounted in the mounting hole 61, the outer peripheral surface 7*c* extends along and is opposed to the inner peripheral edge portion 61*a* of the mounting hole 61 with a slight gap therebetween. In the instant embodiment, the bottom cover 7 is a member formed of synthetic resin, and the cabinet section 2 located upward of the bottom cover 7 is also formed of synthetic resin. Alternatively, only the bottom cover 7 may be formed of synthetic resin, and the cabinet section 2 located above the bottom cover 7 may be formed of metal or any other suitable material.

A flange section 5 of a thin plate shape is formed on the lower end of the bottom cover 7 and projects radially outward from the outer circumferential or peripheral edge of the bottom surface 2*a* of the cabinet section 2. The flange section 5 is formed as an annular edge portion integral with the bottom cover 7 and having a surface extending radially outward at substantially the same height position as the bottom surface 2*a* (speaker surface 4) of the cabinet section 2.

The speaker unit 1 further includes a plurality of provisionally fastening mechanisms 10 for temporarily fastening the speaker unit 1 in the mounting hole 61. These provisionally fastening mechanisms 10 are provided on the outer peripheral side surface 2*c* of the cabinet section 2 for engaging and provisionally fastening the speaker unit 1 to the mounting part 60 with at least a portion of the cabinet section 2 inserted in the mounting hole 61 from the face side of the mounting part 60. Each of the provisionally fastening mechanisms 10 comprises a provisionally fastening tab (resilient member) 11 in the form of a thin resilient metal plate, and a retention section 17. The provisionally fastening tab (resilient provisionally fastening member or piece) 11 has an engagement section 13 formed thereon for provisionally engaging with the mounting part 60, and a distal end portion of the engagement section 13 is formed as an operating section 15 exposed on the face side surface 60*a* of the mounting part 60 so that the operating section 15 is readily operable manually by a human operator. The engagement section 13 is movable between an engagement position in which it engages with the mounting part 60 and a cancellation position in which it cancels the engagement with the mounting part 60 by being moved away from the mounting part 60. The engagement section 13 is positioned in the engagement position or in the cancellation position by being operated with a hand of a human operator. The retention section 17 is constructed to retain the engagement section 13 in the cancellation position where the provisional fastening engagement by the engagement section 13 is canceled (see FIG. 6B). An example detailed construction of the provisionally fastening mechanism 10 will be discussed later.

Further, stopper mechanisms 30 for fully fixing the speaker cabinet 1 having been provisionally fastened in the mounting hole 61 by means of the provisionally fastening mechanisms 10 are provided on the side surface 2*c* of the cabinet section 2. Each of the stopper mechanisms 30 includes a stopper piece 31 provided sideways of the cabinet section 2 in such a manner that the stopper piece 31 is movable in the up-down direction. Each of the stopper mechanisms 30 is constructed to fix the speaker unit 1 by sandwiching the inner peripheral edge portion 61*a* of the mounting hole 61 between the flange section 5 and the stopper piece 31.

Further, FIG. 2 is a schematic plan view of the speaker unit 1 as viewed from the face side of the speaker surface 4. The face side surface of the speaker unit 1 is the bottom surface 2*a* of the cabinet section 2, and the flange section 5 is formed along the outer circumference or periphery of the speaker surface 4. The flange section 5 has the retention sections 17 formed in a plurality of positions thereof for retaining the distal-end operating sections 15 of the corresponding engagement sections 13. In the illustrated example, the retention sections 17, which correspond in number and position to the provisionally fastening mechanisms 10, are disposed in four positions of the circumference or periphery of the flange section 5 at equal intervals along the circumference or periphery.

Each of the retention sections 17 is provided in association with an opening portion (non-shielded portion) 5*a* formed in the flange section 5; for example, the retention section 17 is formed as a peripheral edge of the opening portion 5*a*. Each of the retention sections 17 comprises a retention groove 17*a* for retaining the operating section 15, and a guide groove 17*b* communicating with the retention groove 17*a* for guiding the movement of the engagement section 13 between the engagement position and the cancellation position. As shown in FIG. 2, the distal-end operating section 15 of the engagement section 13 is visible from the face side of the speaker surface 4 through the opening portion 5*a*.

In the instant embodiment, as noted above, the opening portions 5*a* in the form of four holes are formed in the flange section 5 so that the operating section 15 is constructed in an unshielded manner, i.e. in such a manner as to be visible from the face side (underside) of the speaker unit 1. However, the present invention is not so limited as long as the human operator can view the operating sections 15. For example, a continuous ring-shaped opening portion may be formed in and along the entire inner circumference or periphery of the flange section 5 around the speaker surface 4. As another alternative, a plurality of recesses corresponding in number to the provisionally fastening mechanisms 10 may be formed in the circumference or periphery of the flange section 5.

The following describe an example detailed construction of each of the provisionally fastening mechanisms 10. FIGS. 3A to 3C show the speaker unit 1 provisionally fastened to the mounting hole 61 of the mounting part 60, of which FIG. 3A is a side sectional view of the provisionally fastening mechanism 10, FIG. 3B is a side view as viewed in a direction of arrow X of FIG. 3A and FIG. 3C is a plan view as viewed in a direction of arrow Y of FIG. 3A. Note that FIG. 3A shows a vertical sectional view of the provisionally fastening mechanism 10 taken at the position of the engagement section 13, and that only the outline of the cabinet section 2 is shown in these figures with a construction inside the cabinet section 2 omitted for simplicity.

As shown in FIGS. 3A and 3B, each of the provisionally fastening mechanisms 10 includes the elongated provisionally fastening tab (resilient member) 11 fixed at one end (or upper end) portion to the upper surface 2b of the cabinet section 2 and having an intermediate portion bent to project toward the outer peripheral side surface 2c so as to provide the engagement section 13. Another end (or lower end) portion, opposite the one end portion, of the provisionally fastening tab 11 is constructed as the operating section 15 operable manually with a human operator's hand. Namely, the provisionally fastening tab 11 includes: a mounting portion 12 for being fastened to the upper surface 2b of the cabinet section 2 by means of a screw 12a; the engagement section 13 of a stepped shape for engaging with the inner peripheral edge portion 61a of the mounting hole 61 of the mounting part 60; a slant portion 14 extending obliquely downward from the mounting portion 12 toward the bottom surface 2a from the mounting portion 12 and radially outward away from the cabinet section 2; and the operating section 15 extending vertically downward from the inner end 13b of the engagement section 13 toward the bottom surface 2a of the cabinet section 2. Note that, in the instant embodiment, the engagement section 13 engages with the reverse side surface 60b of the mounting part 60 via an attachment member 65, attached to the inner peripheral edge portion 61a of the mounting hole 61, instead of directly engaging with the reverse side surface 60b. Further, whereas, in the instant embodiment, the provisionally fastening tab 11 is fastened to the upper surface 2b of the cabinet section 2, the present invention is not so limited, and the provisionally fastening tab 11 may be fastened to the outer peripheral side surface 2c of the cabinet section 2. Furthermore, whereas, in the instant embodiment, the provisionally fastening tab 11 is fastened to the cabinet 2 by means of the screw 12a, the present invention is not so limited, and the provisionally fastening tab 11 may be fastened to the cabinet 2 by means of a rivet, adhesive joining, welding or the like.

Further, as shown in FIG. 3B, the operating section 15 has a width smaller than that of the engagement section 13 and the slant portion 14. Thus, the operating section 15 is manually operable more easily, so that operability of the provisionally fastening tab 11 can be enhanced. Further, in a case where the operating section 15 is provided to project to the face side (i.e., downwardly) beyond the speaker surface 4, the opening portion 5a and the retention section 17 can also be reduced in size if the operating section 15 is reduced in size. Thus, it is possible to minimize influence which the formation of the opening portion 5a would impart to quality of sound output from the speaker. Whereas the operating section 15 is provided to project to the face side beyond the speaker surface 4 in the instant embodiment, the present invention is not so limited, and the operating section 15 may be located within the opening portion 5a (i.e., disposed retracted from the speaker surface 4 in a direction toward the reverse side), as shown in FIGS. 8A and 8B, without projecting to the face side out of the opening portion 5a beyond the speaker surface 4.

Further, as shown in FIG. 3C, the retention section 17 comprises the retention groove 17a and the guide groove 17b formed, along the inner peripheral edge of the opening portion 5a, in such a manner that the retention groove 17a and the guide groove 17b together constitute a shape substantially similar to a laterally-inverted numeral "7" as viewed from the face side of the opening portion 5a. More specifically, the retention section 17 comprises: the guide groove 17b having a slant surface 17b1 slanting relative to a direction of movement (movement direction) D1 of the operating section 15; and the retention groove 17a communicating with the guide groove 17b and extending from the end of the guide groove 17b in a direction across or traversing the movement direction D1 of the operating section 15 (and hence the engagement section 13). For example, the retention groove 17a extends in a direction D2 generally perpendicular to the movement direction D1 of the operating section 15. With such arrangements, as the human operator operates the operating section 15 in the movement direction D1 toward the cabinet section 2, the operating section 15 moves obliquely upward in FIG. 3C while being guided along the slant surface 17b1. The engagement section 13 too moves integrally with the operating section 15, which means that the movement direction of the engagement section 13 is displaced obliquely upward in FIG. 3C along the slant surface 17b1. Once the operating section 15 reaches the right end of the retention section 17, the operating section 15 moves downward in the direction D2 due to resiliency of the provisionally fastening tab 11 so that it is retained in the retention groove 17a.

Figure 4A:
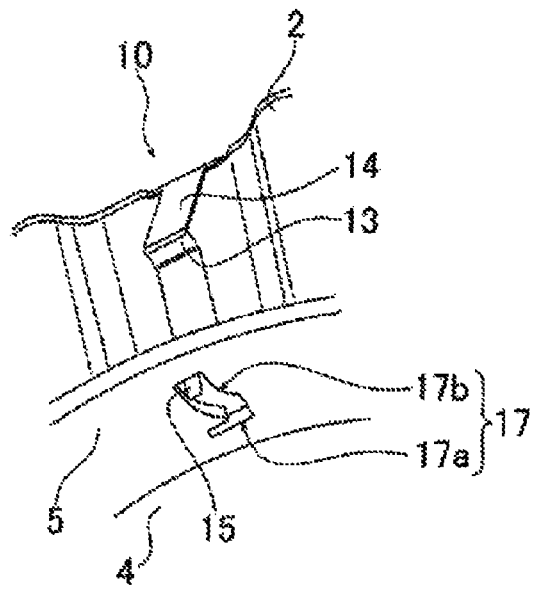
Figure 4B:
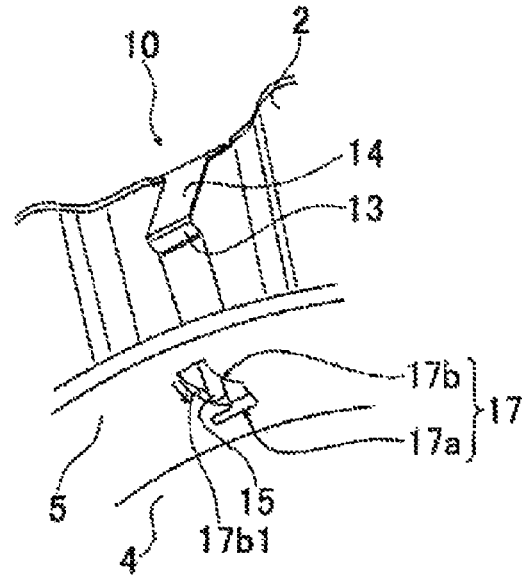
Figure 4C:
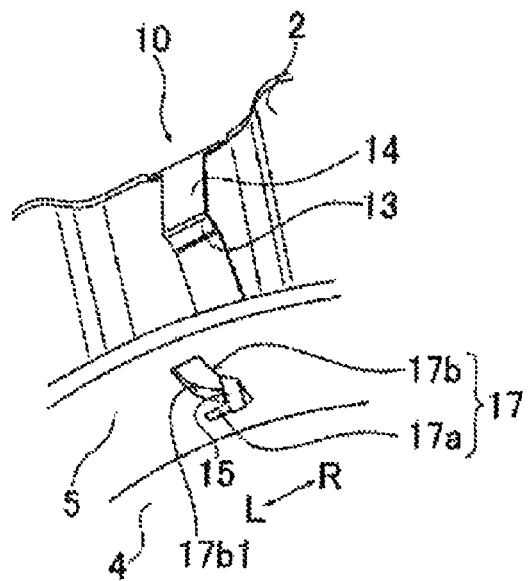
Figure 4D:
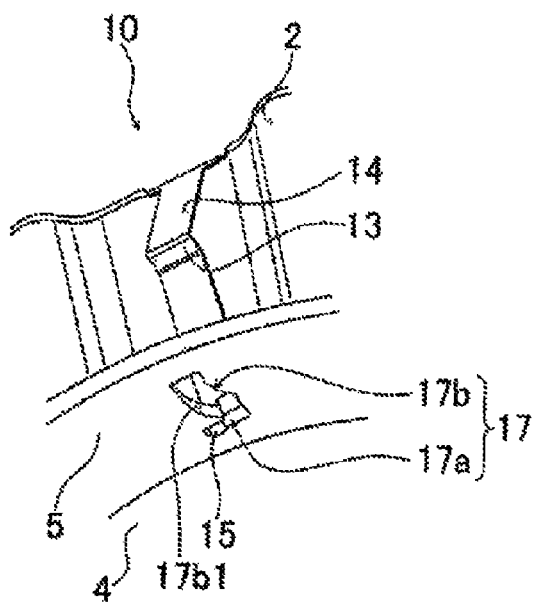

Now, behavior of the entire provisionally fastening tab 11 of the provisionally fastening mechanism 10 will be described in more detail with reference to FIGS. 4A to 4D. FIGS. 4A to 4D are perspective views of the provisionally fastening mechanism 10, of which FIG. 4A shows a state of the provisionally fastening mechanism 10 in which the engagement section 13 is in the engagement position where it engages with the mounting part 60, FIG. 4B shows a state of the provisionally fastening mechanism 10 in which the operating section 15 has abutted against the slant surface 17b1 of the guide groove 17b, FIG. 4C shows a state of the provisionally fastening mechanism 10 in which the operating section 15 has reached the retention groove 17a, and FIG. 4D shows a state of the provisionally fastening mechanism 10 in which the operating section 15 has been retained in the retention groove 17a with the engagement section 13 positioned in the cancellation position by being retracted or moved away from the mounting part 60. Note that illustration of the mounting part 60, the mounting hole 61, the attachment member 65, etc. is omitted for clearly showing the construction and behavior of the provisionally fastening mechanism 10.

When the engagement section 13 is in the engagement position where it engages with the mounting part 60, as shown in FIG. 4A, the operating section 15 is located in an outer portion of the guide groove 17b as viewed in a radial direction of the annular flange section 5. Further, as shown in FIG. 4B, as the operating section 15 is operated radially inward of the flange section 15, the engagement section 13 formed integrally with the operating section 50 moves toward the cabinet section 2 (i.e., radially inward of the flange section 5). At that time, the operating section 15 moves radially inward while being guided along the slant surface 17b1 formed on one side surface of the guide groove 17 so as to slant with respect to the movement direction of the operating section 15. Further, as shown in FIG. 4C, as the operating section 15 is pushed further radially inward in the retention groove 17, the engagement section 13 integral with the operating section 15 too moves away from the inner peripheral edge portion 61a of the mounting hole 61 toward the cabinet section 2, so that the engagement section 13 is placed in the cancellation position where it does not engage with the mounting part 60. In this cancellation position, the resilient provisionally fastening tab 11 has resiliently deformed after having moved rightward (in a direction of arrow R in FIG. 4C) along the slant surface 17b1, and thus, force is acting on the provisionally fastening tab 11 to restore the tab 11 leftward (in a direction of arrow L in FIG. 4C). Once the human operator releases, or lets go of, the operating section 15, the operating section 15 moves leftward by the restoring force accumulated in the provisionally fastening tab 11 as shown in FIG. 4D. Thus, the operating section 15 gets into the retention groove 17a to thereby be positioned (retained) in the retention groove 17a, with the result that the engagement section 13 of the provisionally fastening tab 11 is retained in the cancellation position where it is positioned closer to the cabinet section 2 than the inner peripheral edge portion 61a of the mounting part 61.

Figure 5A:
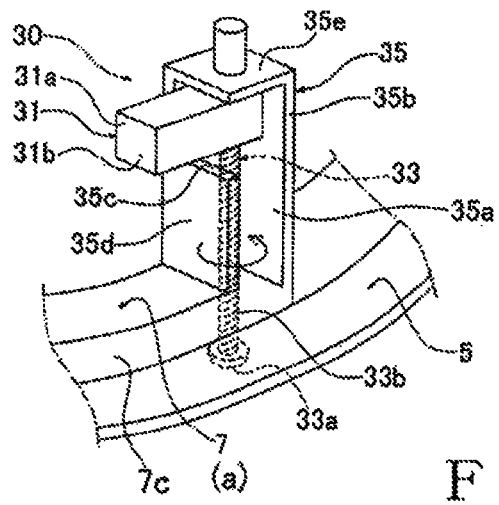
Figure 5B:
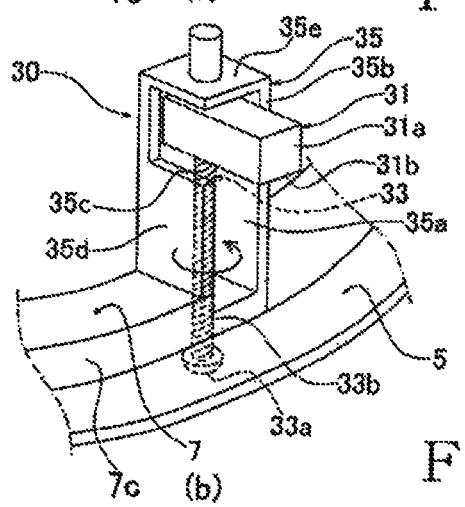
Figure 5C:
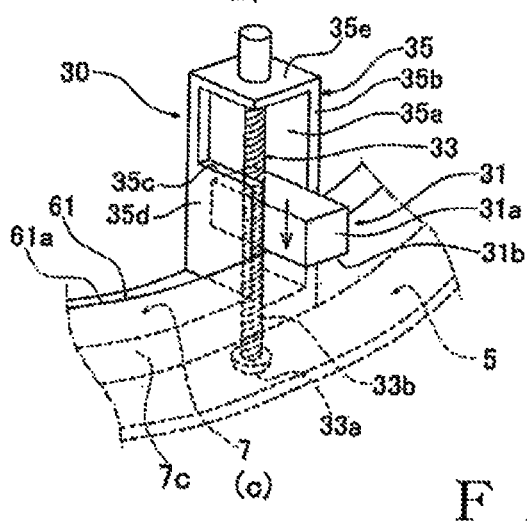

After the speaker unit 1 is provisionally fastened to the mounting part 60 using the above-described provisionally fastening mechanisms 10, it will be fully fastened through full fastening by the stopper mechanisms 30. A construction and behavior of each of the stopper mechanisms 30 at the time of such full fastening will be described with reference to FIGS. 5A to 5C. FIGS. 5A to 5C are schematic perspective views explanatory of a construction and behavior the stopper mechanism 30, of which FIG. 5A shows a state of the stopper mechanism 30 in which the stopper piece 31 is in an initial position, FIG. 5B shows a state of the stopper mechanism 30 in which the stopper piece 31 has pivoted from the initial position, and FIG. 5C shows a state of the stopper mechanism 30 in which the stopper piece 31 is in a fixed position. Note that, in FIGS. 5A to 5C, the stopper piece 31 is shown in a simpler shape than that shown in FIG. 1.

Each of the stopper mechanism 30 includes a frame section 35 rotatably supporting a screw shaft 33, and the stopper piece 31 of a generally columnar shape screwed on the screw shaft 33 and having a portion disposed within the frame section 35. The screw shaft 33 has a head portion 33a exposed on the bottom surface 2a of the speaker unit 1 (i.e., exposed on the same surface as the speaker surface 4), and a shaft portion 33b extending from the head portion 33a, through the bottom cover 7 and the interior of the frame section 35, to an upper wall 35e of the frame section 35 in an up-down direction along the axis of the shaft portion 33b. A thread groove is formed in the outer periphery of the shaft portion 33b. The shaft portion 33b has an upper end portion rotatably mounted to the upper wall 35e of the frame section 35. The screw shaft 33 is rotatable about its axis within the frame section 35 by the head portion 33a being rotated by means of a tool (not shown), such as a screw driver, from below the bottom surface 2a of the speaker unit 1. Further, the stopper piece 31 is screwed on the screw shaft 33 at its near-proximal-end portion, so that, as the screw shaft 33 is rotated, the stopper piece 31 is not only rotatable together with the screw shaft 33 within a plane parallel to the face side surface of the mounting part 60 but movable in the up-down direction relative to the screw shaft 33 through linear feeding by the screw. Further, the stopper piece 31 is movable between the interior of an opening 35a in the form of a vertical slit formed in the front surface of the frame section 35 and the interior of a recess 35c formed in an upper end portion of one side wall 35b of the frame section 35.

In the stopper mechanism 30 constructed in the aforementioned manner, as the screw shaft 33 is rotated in a counterclockwise direction as viewed from below (i.e., from the face side) when the stopper piece 31 is located at the uppermost end in the opening 35a, the stopper piece 31 pivots in the same direction to be located in the recess 35c as shown in FIG. 5A; such a position will be referred to as "initial position of the stopper mechanism 30". As the screw shaft 33 is rotated in the clockwise direction as viewed from below (i.e., from the face side) by the head portion 33a of the screw shaft 33 being rotated by means of a tool, such as a screw driver, from below the bottom surface 2a of the speaker unit 1 when the stopper mechanism 30 is in the initial position, the stopper piece 31 screwed on the screw shaft 33 pivots in the same direction. As shown in FIG. 5B, the stopper piece 31 abuts against the side wall 35b of the frame section 35 after having pivoted through 90° from the initial position in the counterclockwise direction as viewed from above (i.e., from the reverse side), so that further pivoting movement of the stopper piece 31 is restricted. Then, as the screw shaft 33 is further rotated in the clockwise direction, the stopper piece 31 moves downward toward the bottom cover 7 within the opening 35a until the lower surface 31b of the stopper piece 31 abuts against the inner peripheral edge portion 61a of the mounting hole 61 (reverse side surface 60b of the mounting part 60).

As the stopper piece 31 is further moved downward or lowered relative to the screw shaft 33, the position of the speaker unit 1 within the mounting hole 61 gradually moves upward relative to the mounting part 60. Ultimately, the inner peripheral edge portion 61a of the mounting hole 61 is sandwiched between the lower surface 31b of the stopper piece 31 and the flange section 5, so that the speaker unit 1 is fully fixed within the mounting hole 61. Such a position of the stopper mechanism 30 fully fixing the speaker unit 1 will be referred to as "fixing position of the stopper mechanism 30".

In order to cancel the fixation (full fixation), by each of the stopper mechanisms 30, of the speaker unit 1, the screw shaft 33 is rotated in the counterclockwise direction as viewed from below (from the face side) when the stopper mechanism 30 is located in the above-mentioned fixing position. Thus, the stopper piece 31 moves upward relative to the screw shaft 33, which cancels the sandwiching engagement of the inner peripheral edge portion 61a of the mounting hole 61 between the stopper piece 31 and the flange section 5. As the screw shaft 33 is further rotated in the clockwise direction as viewed from above (from the reverse side), the stopper piece 31 moves upward, in response to which the position of the speaker unit 1 within the mounting hole 61 gradually moves downward. Ultimately, the speaker unit 1 stops moving downward at a position where the engagement section 13 of the provisionally fastening tab 11 abuts against the reverse side surface 60b of the mounting part 60 (i.e., the inner peripheral edge portion 61a of the mounting hole 61). Then, as the screw shaft 33 is further rotated in the clockwise direction as viewed from above (from the reverse side), the stopper piece 31 moves up to the uppermost end of the opening 35a, after which the stopper piece 31 rotates in the counterclockwise direction as viewed from below (from the face side) to return to the initial position.

Next, a description will be given about an operational sequence for dismounting the speaker unit 1 from the mounting part 60 with reference to FIGS. 6A to 6C, of which FIG. 6A shows a state in which the engagement section 13 is in the engagement position, FIG. 6B shows a state in which the engagement section 13 is in the cancellation position and FIG. 6C shows a state in which the cabinet section 2 has been displaced downward away from the mounting part 60.

In the fully fixed state of the speaker unit 1, the cabinet section 2 is held pushed toward the reverse side (upper side) more strongly than in the provisionally fastened state of the speaker unit 1 shown in FIG. 3A. The full fixation can be canceled by the stopper piece 31 of the stopper mechanism 30 being returned from the fixing position back to the initial position in accordance with the aforementioned operational sequence. Even after such cancellation of the full fixation, the engagement section 13 still remains in the engagement position shown in FIG. 6A, and the speaker unit 1 still remains in the provisionally fastened state. Thus, in that state, the cabinet section 2 cannot be spontaneously or accidentally dismounted from the mounting hole 61. Here, as the operating section 15 is pulled in a direction of a white arrow in FIG. 6A, the engagement section 13 moves from the engagement position to the cancellation position. Further, once the engagement section 13 of each of the provisionally fastening mechanisms 10 is placed in the cancellation position with the operating section 15 retained by the retention groove 17a of the retention section 17 as shown in FIG. 6B, the provisionally fastening by the provisionally fastening mechanism 10 is canceled, which allows the speaker unit 1 to be dismounted from the mounting hole 61 of the mounting part 60. In this condition, the speaker unit 1 can be displaced downward from, i.e. pulled out of, the mounting hole 61 of the mounting part 60.

Figures 7A, 7B, 7C:
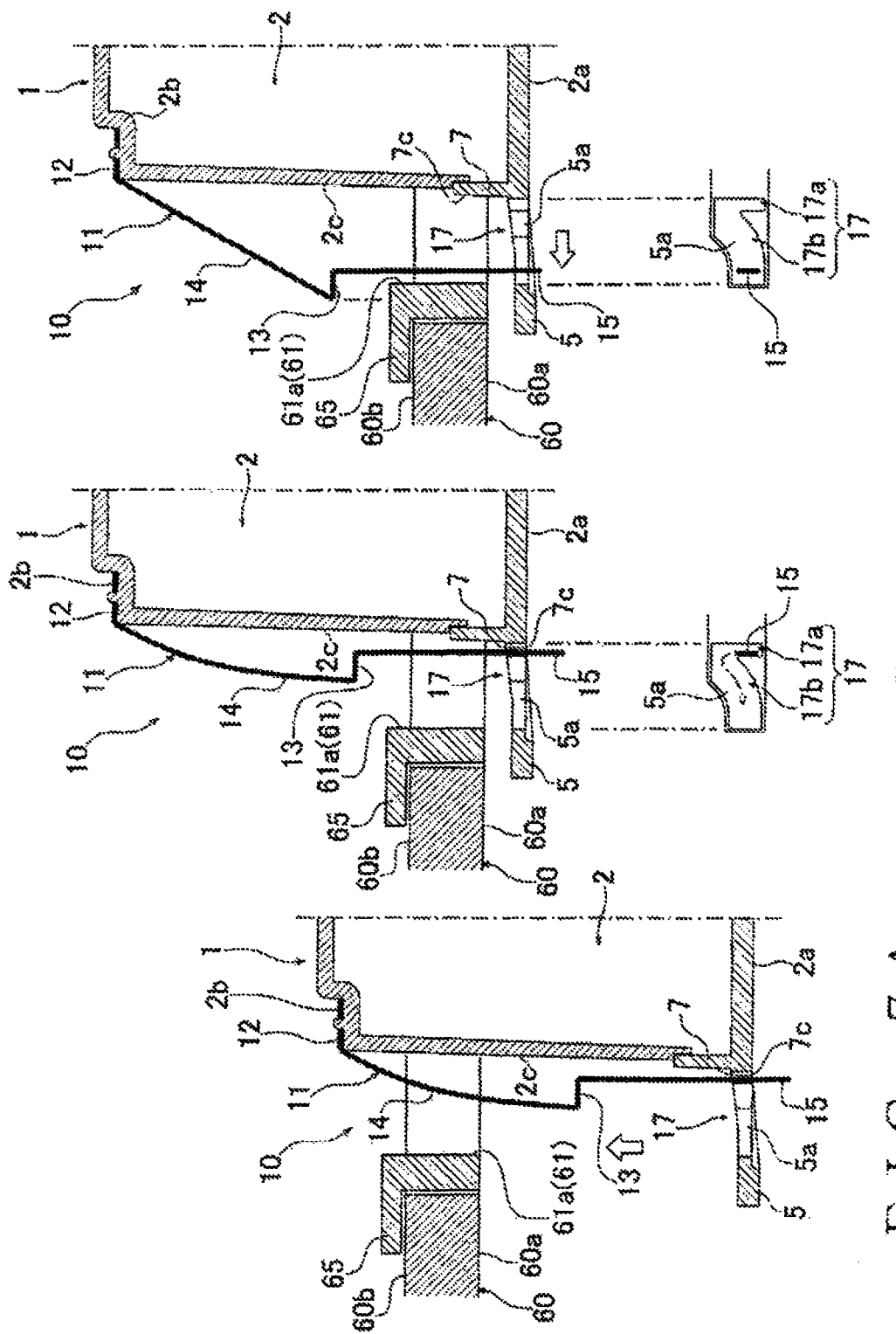

Now, an operational sequence for mounting the speaker unit 1 to the mounting hole 61 of the mounting part 60 will be described with reference to FIGS. 7A to 7C. FIG. 7A shows a state before the cabinet section 2 is mounted to the mounting part 60, FIG. 7B shows a state in which the engagement section 13 is in the cancellation position, and FIG. 7C shows a state in which the engagement section 13 has moved to the engagement position.

When the speaker unit 1 is to be mounted to the mounting hole 61 of the mounting part 60, the speaker unit 1 is moved so as to insert the cabinet section 2 into the mounting hole 61 of the mounting part 60, as shown in FIG. 7A. In this state, the engagement section 13 is retained in the cancellation position by the aforementioned retention section 17 (retention groove 17a). Then, as the cabinet section 2 is moved higher than the attachment member 65 as shown in FIG. 7B, the retention, by the retention section 17 (retention groove 17a), is canceled. Thus, the engagement section 13 is moved from the cancellation position to the engagement position as shown in FIG. 7C, so that the speaker unit 1 can be provisionally fastened to the mounting part 60. After the retention, by the retention sections 17, of all of the operating sections 15 (four operation sections 15 in the instant embodiment) is canceled, the speaker unit 1 can be fully mounted to the mounting part 60 by being fully fixed via the stopper mechanisms 30.

According to the preferred embodiment of the speaker unit 1, where each of the provisionally fastening mechanisms 10 is provided with the retention section 17, the engagement section 13 of the provisionally fastening mechanism 10 can be reliably retained in the cancellation position by means of the retention section 17. Thus, even where the provisionally fastening mechanism 10 has a plurality of such engagement sections 13, there is no need for the human operator to retain with one hand the engagement section 13 having been released from the engagement with the mounting part 60. In this way, the human operator can sequentially cancel the engagement of the plurality of the engagement sections 13, with the result that mounting and dismounting of the speaker unit 1 to and from the mounting part 60 can be performed with an enhanced efficiency. Further, when all of the engagement sections 13 have been released from the engagement with the mounting part 60, the both hands of the human operator are unoccupied or free, so that the human operator can reliably grasp the speaker unit 1 with the both hands and can thereby safely dismount the speaker unit 1 from the mounting part 60.

Further, because the retention section 17 has the retention groove 17a communicating with the guide groove 17b, the engagement section 13 can be smoothly directed to the cancellation position, so that dismounting of the speaker unit 1 can be performed efficiently. Furthermore, the guide groove 17b has the slant surface 17b1 slanting relative to the movement direction D1 of the operating section 15, and thus, as the human operator moves the operating section 15 with a view to canceling the engagement of the engagement section 13 with the mounting part 60, the operating section 15 can be directed along the slant surface 17b1 in such a direction where it slants relative to the movement direction D1. Because the retention groove 17a is formed to extend in the direction D2 generally perpendicular to the movement direction of the engagement section 13, the operating section 15 is retained by the retention groove 17a at a position where it has shifted from the movement in the movement direction D1 to the movement in the direction D2 generally perpendicular to the movement direction D1. Because the operating section 15 is reliably retained by the retention section 17 in the aforementioned manner, there is no need for the human operator to retain the operating section 15 (engagement section 13) with his or her hand, so that the provisionally fastening operation at the time of the mounting and dismounting of the speaker unit 1 can be performed efficiently and safely.

Further, in the above-described preferred embodiment, the retention section 17 is formed as the peripheral edge of the opening portion 5a in communication with the opening portion 5a or recess of the flange section 5. Thus, the human operator can perform the operation while viewing the engagement section 13 through the opening portion 5a of the flange section 5, so that the human operator can efficiently perform the operation for retaining the engagement section 13 by means of the retention section 17.

Further, the distal-end operating section 15 of the engagement section 13 may be constructed to project to the face side beyond the speaker surface 4 or may be disposed retracted from the speaker surface 4 in the direction toward the reverse side of the mounting part 61 without projecting to the face side beyond the speaker surface 4. With the operating section 15 of the engagement section 13 projecting to the face side beyond the speaker surface 4, the human operator can grasp (operate) the engagement section 13 more easily and thereby enhance the operating efficiency. If the operating section 15 of the engagement section 13 is constructed to be disposed retracted from the speaker surface 4 in the direction toward the reverse side of the mounting part 60, without projecting to the face side beyond the speaker surface 4, on the other hand, a degree of structural and design freedom of elements around the speaker surface 4 can be enhanced, because the operating section 15 does not project to the face side beyond the speaker surface 4. Even with the operating section 15 of the engagement section 13 disposed retracted from the speaker surface 4 in the direction toward the reverse side of the mounting part 60 without projecting to the face side beyond the speaker surface 4, the human operator can perform the operation while viewing the engagement section 13 through the opening portion 5a, and thus, the operation for retaining the engagement section 13 by the retention section 17 can be performed with an enhanced efficiency.

Whereas the present invention has been described above in relation to the preferred embodiment, the present invention is not limited to the above-described embodiment and may be modified variously within the scope of the technical idea disclosed in the appended claims, the specification and the drawings. For example, the shapes and sizes of the guide and retention grooves of the retention section 17 and the opening portion 5a of the flange section 5 are not limited to those illustratively shown and described above in relation to the preferred embodiment. Further, the opening portion 5a need not necessarily be formed in the flange section 5 as long as the distal end of the engagement section 13 is visible by the human operator from the face side.

Further, whereas the preferred embodiment of the invention has been described above in relation to the case where the retention section 17 is formed in the opening portion 5a of the flange section 5, the present invention is not so limited as long as the retention section 17 is located in such a position where it is capable of limiting the movement of the engagement section 13. For example, the retention section 17 may be formed in the peripheral side surface 2c of the cabinet section 2 between the engagement section 13 of the provisionally fastening tab 11 and the operating section 15.

Further, whereas the preferred embodiment of the invention has been described above in relation to the case where the speaker unit 1 is mounted to the mounting hole 61 formed in the mounting part, such as a ceiling, the speaker unit 1 of the present invention may be mounted to other than the mounting part like a ceiling; for example, the speaker unit 1 of the present invention may be mounted by being embedded in a mounting hole formed in a vertical wall, a slanting wall.

Furthermore, the material, shape, size, etc. of the provisionally fastening tab (or provisionally fastening piece) 11 in the above-described preferred embodiment are only illustrative, and the provisionally fastening piece 11 in the present invention may be of any other material, shape, size, etc. than those illustratively shown and described in relation to the above-described preferred embodiment. For example, the provisionally fastening piece 11 may be formed of other than the above-mentioned resilient metal material, such as any one of various synthetic resin materials (e.g., plastic, ABS resin and acryl resin) and rubber materials, as long as the material of the provisionally fastening piece 11 has resiliency similar to leaf-spring-like resiliency. Further, the provisionally fastening piece 11 may be, for example, in the form of a bar rather than a thin plate-shaped piece as employed in the above-described preferred embodiment. Furthermore, the provisionally fastening piece 11 need not necessarily be a single integrally-formed piece as long as it has portions corresponding to the aforementioned engagement section and the operating section. For example, the engagement section, the operating section, the slant portion, etc. may be separate elements connected with one another and separable from one another as appropriate in response to an operation performed by the human operator on the operating section. Furthermore, where the provisionally fastening piece 11 is in the form of a single integrally-formed piece, the entirety of the single integrally-formed piece need not necessarily be constructed to be resiliently deformable and may be resiliently deformable only in part such that the engagement section can be shifted between the engagement position and the cancellation position.

Furthermore, the provisionally fastening piece 11 need not necessarily be constructed to be operated by being depressed by the human operator as described in the above-described preferred embodiment, and it may be constructed to be operated in any other desired manner; for example, it may be operated by being operated or moved toward the human operator or moved laterally.

Furthermore, whereas the preferred embodiment of the speaker unit 1 has been described above as containing various components or elements, such as a speaker driver, within the cabinet section 2, the speaker unit to be mounted to a mounting part, such as a ceiling or a wall, by use of the mounting structure of the present invention may be one that contains no components or just some components. Namely, the speaker unit including only the box-shaped cabinet section may be first mounted to an opening section of a ceiling or the like by means of the mounting structure of the present invention, and then, components of the speaker unit may be accommodated in the cabinet section.

This application is based on, and claims priority to, JP PA 2015-017992 filed on 30 Jan. 2015. The disclosure of the priority application, in its entirety, including the drawings, claims, and the specification thereof, are incorporated herein by reference.

What is claimed is:

1. A speaker unit for mounting to an opening section formed in a mounting part, the speaker unit comprising:
   a cabinet section having a side surface and a bottom surface;
   a speaker surface provided in the bottom surface of the cabinet section; and
   a provisionally fastening mechanism disposed on the side surface of the cabinet section and configured to provisionally fasten the speaker unit to the mounting part with at least a portion of the cabinet section inserted in the opening section from a face side of the mounting part, the provisionally fastening mechanism including:
      a resilient member having an engagement section configured to provisionally support the speaker unit to the mounting part, and movable between an engagement position where the engagement section engages with the mounting part and a cancellation position where the engagement section cancels engagement with the mounting part by being retracted from the mounting part; and
      a retention section configured to retain the engagement section, and including:
         a retention groove configured to retain a distal end portion of the resilient member so that the engagement section is retained in the cancellation position; and
         a guide groove communicating with the retention groove and configured to guide the distal end portion so that the engagement section is maintained at the engagement position or the cancellation position,
         wherein the guide groove has a slant surface configured to gradually displace a direction of movement, along the guide groove, of the engagement section, and wherein the retention groove extends from an end of the slant surface in a direction traversing the movement direction of the engagement section.

2. The speaker unit as claimed in claim 1, wherein:
the engagement section is disposed at an intermediate portion of the resilient member, which has a proximal end portion fixed to the cabinet section, and
the engagement section is positioned in the engagement position or in the cancellation position in response to the distal end portion of the resilient member being operated manually by a human operator.

3. The speaker unit as claimed in claim 1, wherein the distal end portion projects to a face side beyond the speaker surface.

4. The speaker unit as claimed in claim 1, wherein a plurality of the provisionally fastening mechanisms are provided on an outer periphery of the cabinet section.

5. The speaker unit as claimed in claim 1, further comprising an additional fastening mechanism configured to fully fasten the speaker unit provisionally fastened to the mounting part by the provisionally fastening mechanism.

6. A speaker unit for mounting to an opening section formed in a mounting part, the speaker unit comprising:
a cabinet section having a side surface and a bottom surface;
a speaker surface provided in the bottom surface of the cabinet section; and
a provisionally fastening mechanism disposed on the side surface of the cabinet section and configured to provisionally fasten the speaker unit to the mounting part with at least a portion of the cabinet section inserted in the opening section from a face side of the mounting part, the provisionally fastening mechanism including:
a resilient member having an engagement section configured to provisionally support the speaker unit to the mounting part, and movable between an engagement position where the engagement section engages with the mounting part and a cancellation position where the engagement section cancels engagement with the mounting part by being retracted from the mounting part; and
a retention section configured to retain the engagement section, and including:
a retention groove configured to retain a distal end portion of the resilient member so that the engagement section is retained in the cancellation position; and
a guide groove communicating with the retention groove and configured to guide the distal end portion so that the engagement section is maintained at the engagement position or the cancellation position,
wherein the cabinet section has a flange section projecting radially outward from an outer peripheral edge of the bottom surface of the cabinet section, and having an opening or recess, and
wherein the distal end portion extends through the opening or recess of the flange section.

7. The speaker unit as claimed in claim 6, wherein the distal end portion is disposed retracted from the speaker surface in a direction toward a reverse side of the mounting part without projecting to a face side beyond the speaker surface.

* * * * *